(12) United States Patent
Miebach (10) Patent No.: US 12,290,956 B2
(45) Date of Patent: May 6, 2025

(54) DRILL BIT COMPRISING A CENTERING TIP

(71) Applicant: Colt Technologies GmbH, Lindlar (DE)

(72) Inventor: Jürgen Miebach, Lindlar (DE)

(73) Assignee: COLT TECHNOLOGIES GMBH, Lindlar (DE)

( * ) Notice: Subject to any disclaimer, the term of this patent is extended or adjusted under 35 U.S.C. 154(b) by 764 days.

(21) Appl. No.: 17/430,967

(22) PCT Filed: Feb. 13, 2020

(86) PCT No.: PCT/EP2020/053822
§ 371 (c)(1),
(2) Date: Aug. 13, 2021

(87) PCT Pub. No.: WO2020/165378
PCT Pub. Date: Aug. 20, 2020

(65) Prior Publication Data
US 2022/0134449 A1 May 5, 2022

(30) Foreign Application Priority Data
Feb. 15, 2019 (WO) .................. PCT/EP2019/053901

(51) Int. Cl.
*B27G 15/00* (2006.01)

(52) U.S. Cl.
CPC .................................. *B27G 15/00* (2013.01)

(58) Field of Classification Search
CPC ... B23B 47/34; B23B 51/0054; B23B 51/009; B23B 51/0081; B23B 51/0426; B23B 51/02; B27G 15/00; B27G 15/02
See application file for complete search history.

(56) References Cited

U.S. PATENT DOCUMENTS

| 248,854 | A | 11/1881 | Gladwin |
| 1,169,406 | A | 1/1916 | Konieczka |

(Continued)

FOREIGN PATENT DOCUMENTS

| DE | 29906495 U1 | 10/1999 |
| DE | 202009000930 U1 | 4/2009 |

(Continued)

OTHER PUBLICATIONS

Int'l Search Report issued Apr. 23, 2020 in Int'l Application No. PCT/EP2020/053822.

(Continued)

*Primary Examiner* — Matthew Katcoff
(74) *Attorney, Agent, or Firm* — Panitch Schwarze Belisario & Nadel LLP (57) ABSTRACT

A drill bit, e.g., a serpentine drill or an auger bit, includes a circumferential chip removal groove helically about a drill axis and a centering tip having a conical shape with an apex on the drill axis. The centering tip has a lateral cone surface that has a taper angle with a centering tip helical thread which spirals helically from the apex down the centering tip in a thread direction of rotation at a tip thread pitch. At least one tip recess is included in a side of the centering tip which provides a cutting edge, and which has a chip transporting shape and connecting to the circumferential external thread. The cone surface includes at least one step in the taper angle of the lateral surface with each step starting at a step-start position and the at least one step continues about the drill axis at least 90 degrees.

18 Claims, 10 Drawing Sheets

(56) References Cited

U.S. PATENT DOCUMENTS

| | | | |
|---|---|---|---|
| 2,358,077 A | | 9/1944 | Koett |
| 4,536,107 A * | | 8/1985 | Sandy .................... B27G 15/00 |
| | | | 408/230 |
| 5,244,319 A | | 9/1993 | Cochran |
| 6,428,250 B2 * | | 8/2002 | Giebmanns ............. B23B 51/02 |
| | | | 408/214 |
| 9,137,955 B1 * | | 9/2015 | VanDusartz ........... A01G 23/06 |
| 11,007,584 B2 * | | 5/2021 | Wang ...................... B23B 51/02 |
| 11,273,501 B2 * | | 3/2022 | Parendo .................. B23B 51/02 |
| 2002/0032492 A1 * | | 3/2002 | Sohner ............... G06Q 10/0631 |
| | | | 700/95 |

FOREIGN PATENT DOCUMENTS

| | | | |
|---|---|---|---|
| DE | 102011078303 A1 | | 1/2013 |
| WO | 2013/077857 A1 | | 5/2013 |

OTHER PUBLICATIONS

Int'l Preliminary Report on Patentability issued May 27, 2021 in Int'l Aplication No. PCT/EP2020/053822.

* cited by examiner

DRILL BIT COMPRISING A CENTERING TIP

CROSS-REFERENCE TO RELATED APPLICATIONS

This application is a Section 371 of International Application No. PCT/EP2020/053822, filed Feb. 13, 2020, which was published in the English language on Aug. 20, 2020, under International Publication No. WO 2020/165378 A1, which claims priority under 35 U.S.C. § 119(b) to International Application No. PCT/EP2019/053901 filed Feb. 15, 2019, the disclosures of each of which are incorporated herein by reference in their entireties.

FIELD OF THE INVENTION

The invention relates to a drilling bit comprising a centring tip.

BACKGROUND OF THE INVENTION

To increase a cutting performance or to increase service life improvements of the drill are known. For example, in DE7722409U an auger drill with pre-cutter disclosed, whereby an improved cutting performance can be achieved. In DE29906495U1 or DE 20006541U1 describes a respective auger bit with replaceable centering tip, which increases the stability of the auger.

U.S. Pat. Nos. 1,169,406, 2,358,077, 5,244,319, 248,854 and 4,536,107 all describe various amendments to drill bits.

DE102011078303 according to its abstract discloses: "The drilling bit comprises a circumferential external thread with a centering tip lying in a drilling axis (a), a main cutting edge, and a chip ejection groove helically arranged around a core for discharge of drill cuttings from the main cutting edge against the drilling direction. A recess is provided, which is introduced in the centering tip that interrupts the external thread of the centering tip over a tooth width of the external thread.".

SUMMARY OF THE INVENTION

Amongst others, one of the wear on the centering tip and the breaking or chips can be improved.

Hence, it is an aspect of the invention to provide an alternative drill bit which preferably further at least partly obviates one or more of above-described drawbacks.

There is provided a drill bit drill bit, in particular serpentine drill, more in particular an auger drill bit, comprising a circumferential chip removal groove helically about a drill axis and a centering tip:
  having a conical shape with an apex on said drill axis;
  comprises a lateral surface that has a taper angle;
  comprising a centering tip helical thread which spirals helically from said apex down said centering tip in a thread direction of rotation at a tip thread pitch, and
  comprising at least one tip recess in a side of the centering tip which provides a cutting edge, an which has a chip-transporting shape and connecting to said circumferential external thread,
  characterized in that
  said lateral surface comprises at least one step in said taper angle of said lateral surface with each step starting at a step-start position and said at least one step continues at least 90 degrees about said drill axis.

The current centering tip allows improved control of the feed. The drill bit can have an improved stability. Furthermore, it can have a better cutting performance. The centering itself, the speed at which the drill enters the material to be drilled, as well as the cutting and breaking of produced chips can be controlled better. Furthermore, the step introduces or can introduce an asymmetry that can reduce wear and friction. It furthermore causes easier chip-breaking.

Some of the definitions below are based upon Wikipedia, but are specific for the current description and claims.

The perimeter of the base of the cone is here referred to as the base directrix. Line segments between the directrix and the apex are referred to as generatrix or generating line of the lateral surface.

The base radius of a circular cone is the radius of its base; often this is simply called the radius of the cone. The aperture of a right circular cone is the maximum angle between two generatrix lines; if the generatrix makes an angle $\theta$ to the axis, the aperture is $2\theta$.

A cone perimeter line is here defined as a line on the lateral surface and about the drill axis. The perimeter line can be helical. A right angle perimeter line is in a plane that is perpendicular to the drill axis, i.e., is normal to the drill axis.

A generatrix step section is defined as a generatrix part between two steps in said taper angle.

The helical tip can be referred to as a functional cone or functionally being a cone. This means that the helical tip can be a mathematical cone, but it can also deviate slightly from such a mathematical cone to that extend that is functions as a mathematical cone.

The current helical tip in an embodiment is selected from a circular cone, an elliptical cone, and a combination thereof. In an embodiment, it is a circular cone. An elliptical cone is a cone with an elliptical base.

Usually, in order to provide proper guiding or the drill bit, the centering tip is a right angle cone, although in the current embodiments it has parts where the taper angle changes.

In an embodiment, the drill bit relates to a drill bit for wood. In a further embodiment, it relates to a brad point bit or dowelling bit, although here a particular design for the centering tip is proposed. In an embodiment, the centering tip is used in for instance wood drills like Auger bits, but it may well be used in other or similar drill bits.

The proposed centering tip is in an embodiment suited for auger drill bits, or similar drill bits where chips of material need to be transported and removed.

The drill bit usually has a spiral that is helical around the drill axis.

Drill bit geometry has several characteristics (source: Wikipedia), where some are currently relevant:

The spiral (or rate of twist) in the drill bit controls the rate of chip removal. A fast spiral (high twist rate or "compact flute") drill bit is used in high feed rate applications under low spindle speeds, where removal of a large volume of chips is required. Low spiral (low twist rate or "elongated flute") drill bits are used in cutting applications where high cutting speeds are traditionally used, and where the material has a tendency to gall on the bit or otherwise clog the hole, such as aluminium or copper, and The length of a bit determines how deep a hole can be drilled, and also determines the stiffness of the bit and accuracy of the resultant hole. While longer bits can drill deeper holes, they are more flexible meaning that the holes they drill may have an inaccurate location or wander from the intended axis. Twist drill bits are available in standard lengths, referred to as Stub-length or Screw-Machine-length (short), the extremely common Jobber-length (medium), and Taper-length or Long-Series (long).

The centering tip can for instance be applied to a drill bit that is referred to as a Twist drill bit. Based on Wikipedia, it is here defined in the following way.

The twist drill bit comprises a cutting point at the tip of a cylindrical shaft with helical flutes; the flutes act as an Archimedean screw and lift swarf out of the hole.

The twist drill bit was invented by Steven A. Morse of East Bridgewater, Massachusetts in 1861. The original method of manufacture was to cut two grooves in opposite sides of a round bar, then to twist the bar (giving the tool its name) to produce the helical flutes. Nowadays, the drill bit is usually made by rotating the bar while moving it past a grinding wheel to cut the flutes in the same manner as cutting helical gears.

The twist drills comprise a main cutting edge at the tip or front end of the drill bit. For wood and softer material, the cutting angle (with the drill axis) of the main cutting edge can be an aggressive 90 degrees. For other material, the main cutting edge cutting angle can be smaller, up to 50 degrees.

In the current application, such a twist drill bit comprises the centering tip.

In the current application, the taper angle refers to the angle between the drill axis and the lateral cone surface. In the current centering tip, this lateral surface has at least one step in taper angle. Thus, the lateral surface along a line connecting the step start position and the apex, the taper angle is changed. It was found that such a step between two subsequent threads of said centering tip helical thread applies a force to a chip that is produced and transported between the threads that helps in breaking of the chips.

Furthermore, when such a step increases the taper angle it may reduce wear on the lateral surface.

In an embodiment, the step spirals up said centering tip between at least two subsequent threads of said centering tip helical thread.

In an embodiment the at least one step spirals up said centering tip, in a direction of step rotation which is opposite of said direction of thread rotation, thus providing a change of said taper angle, said at least one step designed to position said apex on said drill axis.

In an embodiment the at least one step comprising a first step in said taper angle starting at a first step start positon and increasing said taper angle with at least 5 degrees, in particular further comprising a second step having a second step start position at a centering tip height between said first step start position and said apex and increasing said taper angle at least 10 degrees.

In an embodiment each next step more towards the apex defines a larger taper angle than a previous step.

In an embodiment virtual step start positions are designed on generatrix step sections on opposite sides of the centering tip and said centering tip comprises two opposite recesses positioned on said generatrix step sections, thus providing step start positions on edges of said recesses.

In an embodiment the steps in said taper angle between recess edges provide differing taper angels while positioning said apex on said drill axis, thus providing an asymmetric centring tip.

In an embodiment the drill bit comprise two of said recesses opposite one another on said centering tip, and said at least one step running from one recess to the next.

In an embodiment the at least one recess extends between a directix of said centering tip and said apex over at least two thread distances.

In the current application, DE102011078303 is explicitly cited by reference and is included in this application. The features described in that application, like for instance the recess that is referenced with number 8, can be included in the current centering tip in order to further improve any one of the centering, the speed, and chip breaking. In fact, the change or step or steps in the outer surface of the centering tip combined with the recess as described in that patent application even further improves the performance of the current centering tip.

In an embodiment, the recess extends axially over at least two tooth widths. In principle, the recess may extend over the entire centering tip. The recess may extend axially at least over one third of the height, in an embodiment over half the height of the centering tip. In an embodiment, the recess terminates at a distance to a free end of the centering tip. Thus, the external thread can be formed undisturbed in the region of the free end. The centering tip itself can then be made stable enough in this area in order to fulfill its function of centering and propulsion of the drill sufficiently. In an embodiment, the recess ends at a distance of 0.2 to 0.5 of the height of the centering tip below the free end thereof.

In order to achieve a good cutting action and chip removal, it is proposed that the depth of the recess be greater than a thread depth, preferably greater than a double thread depth and preferably greater than a three-fold thread depth of the external thread of the centering. An optimal extension of the recess on the centering and/or centering in and/or an optimal maximum depth of the recess may be of an optimization of several factors, such as desired centering means of the centering, feed force by means of the external thread, sufficient stability of the centering despite cross-sectional reduction due to Recess and the opposite a desired cutting action or chip breakage and/or chip transporting by means of the recess, depend.

In an embodiment of the drill, in particular the auger drill, the recess may be elongated or groove-shaped.

This groove-shaped recess, referred to below as the groove, can extend axially, at least with one main extension component. extend in the drilling direction, at least over one third of the height of the centering tip. The groove may, for example, extend helically over the centering tip, wherein the pitch is preferably at least more than twice as large as a pitch of the external thread. In an embodiment, for manufacturing reasons, the recess or the groove extends at least substantially non-curved lengthwise.

The recess is in an embodiment introduced laterally into the centering tip with a main direction component radial to the drill axis. Thus, with respect to a circumferential direction, a larger opening width of the recess is possible without weakening the drill core too much. This can improve in particular a chip removal. In an embodiment, the recess with respect to its cross section with its thus radially inner front side or flank at a first angle greater than 0° and less than 90° to the radial direction can be laterally introduced into the centering tip. This first angle may have an angle value in the range of greater than or equal to 15° to less than or equal to 70°, preferably greater than or equal to 20° to less than or equal to 50° and ideally to 30°. Thus, the recess may be spaced by a preferred small amount to the drill axis. Thus, the recess can be designed to be effective large, without weakening the core unduly. For example, conventional auger bits can be used as a starting material, in the recess or Recesses introduced, in particular, as in the groove-like recess, are introduced laterally.

The main cutting edge can have a first section radially on the outside and a second section adjoining the first section radially inward, wherein the two sections are arranged at a second angle relative to one another with respect to a cross-sectional plane. Thus, between the first and the second section a chipping break causing discontinuity in the course of the main cutting edge can be formed. The second portion may be formed by the front side of the recess. This second section can be formed with the introduction of the recess in the centering tip. Thus, the second portion may be formed by radially inner side of the recess. The second portion may extend at least approximately radially inward. The first portion may extend radially and circumferentially. Thus, the first portion with respect to a circumferential circle tangentially and radially spaced from the drill center can be arranged. The second angle between the two sections may be 10° to 90°, preferably 15° to 70° and ideally 30°.

In the usual way, the main cutting edges or their respective first section can increase radially from inside to outside with respect to the direction of rotation of the drill bit and can be arranged to follow. Thus, the length of the cutting edge can be increased in comparison to a purely radial extension of the main cutting and the cuttings are cut off at the bottom easier.

The centering tip may preferably be formed axially symmetrical to the drill axis. For this purpose, the centering tip may have at least two main cutting edges arranged radially at least in relation to the drill axis. The main cutting edges may be formed with respect to the drill axis as axis of symmetry axially symmetrical to each other and/or arranged. The main cutting edges can be arranged at least approximately parallel to one another with regard to their longitudinal extent. In drill rotation direction before the main cutting an associated chip removal groove can be arranged in the usual way in each case. Also, two recesses may be introduced into the centering tip. With regard to the drill axis, the recesses can be arranged and/or formed at least approximately axially relative to one another or at least approximately axially symmetrically with respect to the drill axis. These recesses can, preferably formed like a groove, open into the respectively associated chip removal groove.

Thus, circumferentially spaced and circumferentially spaced recesses and main cutting edges can be arranged. This axisymmetric design of the centering tip or the drill head or working end allows a corresponding symmetrical torque load of the drill during use.

In a further embodiment of the drill, the main cutting edges can extend radially inwardly by a small amount radially into the centering point or below the centering point. Thus, the chip-breaking effect can be enhanced in the transition from the main cutting edge to the centering.

In a further embodiment, the centering tip and/or drill head can be arranged exchangeably. This has the advantage that the centering tip can be replaced as a wearing part, so that the remaining part of the drill can continue to be used. The interchangeability of the centering also allows that after inserting the recess in the centering tip, the centering can be cured or cured at least in the region of the recess, so that the cutting action on the recess can be maintained over extended periods.

There is further provided a drill bit, in particular serpentine drill, more in particular an auger drill bit, comprising a circumferential chip removal groove helically about a drill axis and a centering tip:
  having a conical shape with an apex on said drill axis;
  comprises a lateral surface that has a taper angle;
  comprising a centering tip thread which spirals from said apex down said centering tip in a thread direction of rotation at a tip thread pitch, and
  comprising at least one tip recess in a side of the centering tip which provides a cutting edge, an which has a chip-transporting shape and connecting to said circumferential external thread, characterized in that
  said lateral surface along a generatrix comprises at least one discontinuity in said taper angle, said discontinuity continuing at least 90 degrees about said drill axis.

There is further provided a drill bit, comprising a centering tip having a shape of at least one frustoconical part having first taper angle fitted with a cone with an apex and having a cone taper angel that is larger than the first angle. In an embodiment, the centering tip has a shape of at least fitted frustoconical parts having different taper angles and fitted with a cone having yet another taper angle.

There is further provided a drill bit, comprising a centering tip having a conical shape and said tip comprising a thread, said tip further comprises opposite recesses, with said recesses ending at different heights with respect to an end of said tip. This provides asymmetric recesses. These recesses, as well as those described further, in fact are substantially circle cylindrical removed parts. The axes of each cylinder are at a slight angle with respect to the rotational axis of the drill bit.

The asymmetrical recesses can be combined with the earlier-discussed aspects.

These shapes in an embodiment have a rotational axis and said apex positioned in said rotational axis.

The terms "upstream" and "downstream" relate to an arrangement of items or features relative to the propagation of the chips from the centering tip to the shank of the drill bit.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel.

This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1:
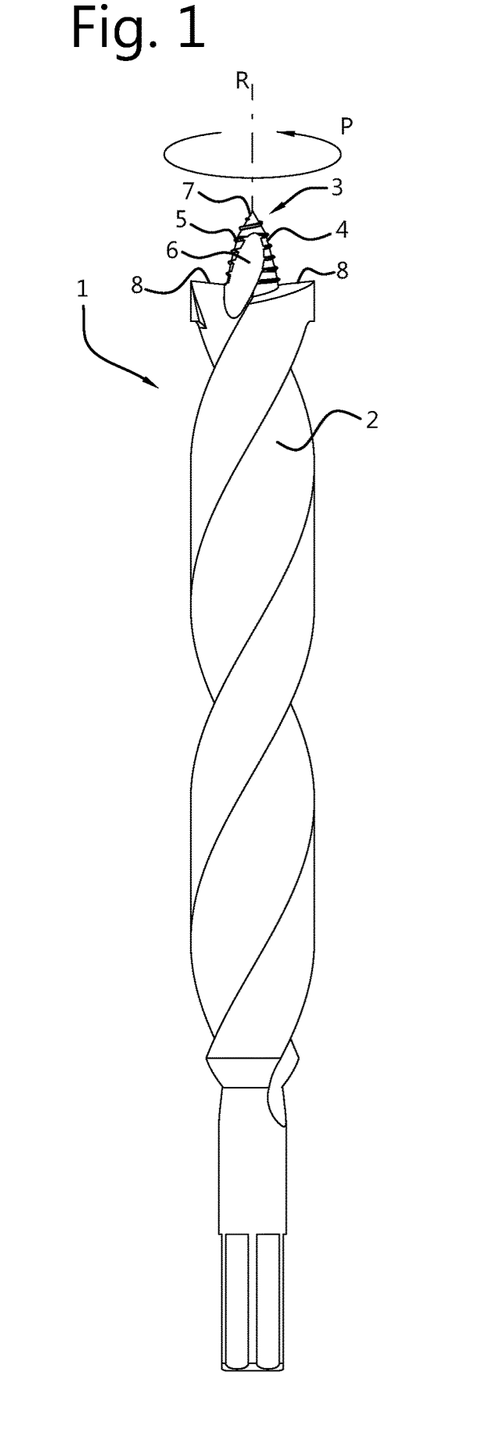
FIG. 1 schematically depicts a side view of a drill bit with centering tip with recesses.

FIG. 1 schematically depicts a side view of an example of a drill bit 1. The drill bit 1 has a circumferential chip removal groove 2 that spirals about drill axis R which usually is the longitudinal axis of the drill bit 1. The external thread 2 has a rate of twist or pitch at which it spirals around or about the drill axis R. The shape and pitch, but also other parameter of the chip removal groove 2 like for instance its profile of flute or groove profile for instance are designed for what the drill is to be used for. The chip removal groove 2 usually has a secondary cutting edge at a helix angle.

The drill bit 1 at a working end comprises a main cutting edge 8. The main cutting edge 8 is at an angle with the drill axis R. For wood, for instance, it is often at 90 degrees. For other applications, usually for drilling harder material it can be up to 50 degrees.

The current drill bit 1 comprises a centering tip 3. The centering tip 3 provides centering of the drill bit 1. Furthermore, it can determine the speed at which the drill bit 1 goes into material to be drilled. The centering tip 3 has an conical shape. It has an apex 7 which is positioned on the drill axis R in order to provide proper centering. The centering tip 3 has a lateral surface 4. On the lateral surface 4 of the centring tip 3, it comprises a centering tip helical thread 5. The centering tip helical thread 5 here has a tooth cross section. The centering tip helical thread 5 pitch that can be constant when spiraling down from said apex 7, but it man also show a slight change in pitch. The centering tip helical thread 5 spirals down in a thread direction of rotation.

The current drill bit 1 has a centering tip 3 that is provided with at least one tip recess 6. The at least one tip recess 6 extends over at least two subsequent windings of the centering tip helical thread 5. In an embodiment, the centering tip 3 comprises two recesses 6 at opposite positions in the centering tip 3. The recesses reduce wear and force or the centering tip. The recesses furthermore provide a recess cutting edge 12 that helps the centering tip 3 to enter the material to be processed. The recess 6 is here at an angle with respect to a generatrix G. In particular, The recess angle is opposite the The profile and nature of the recess 6 as such is extensively described in the already referred to earlier application DE 102011078303. Its cross section can be asymmetric.

Laterally into the centering tip 3 there are currently introduced two elongated, groove-like recesses 8 arranged radially opposite one another and axially aligned with the drill axis R, extending longitudinally approximately in the direction of the drill axis R and counterclockwise in the direction into which an associated chip removal groove 2 opens.

With introduction of the two recesses 6, a maximum diameter on the base side of the centering tip 3 is reduced, here about 60%. Offset by 90°, the maximum diameter of the centering tip 3 is unchanged. Our own experiments show that the stability of the center point is not permanently impaired by this.

The recesses 6 extend in each case by a first amount of their axial extent into the associated chip ejection groove 2 and by a second amount over the axial height of the centering tip 3. The axial extent of the groove-like recesses 6 is thus in each case the sum of these two amounts. The recesses 6 are thus spaced at a distance from a free end of the centering tip 3, so that here the original functionality of the centering tip 3 with respect to centering and propulsion is completely retained.

Figure 2A:
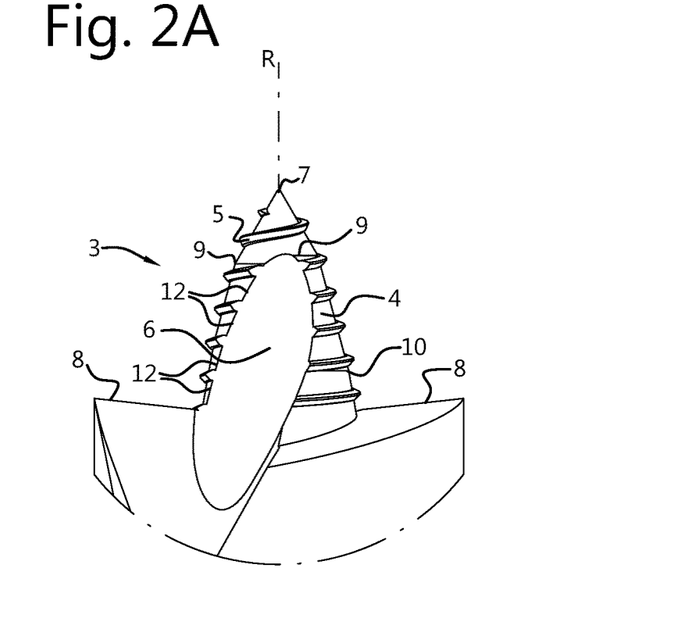
FIGS. 2A and 2B show two side views from the drill bit of FIG. 1 from opposite sides.
Figure 2B:
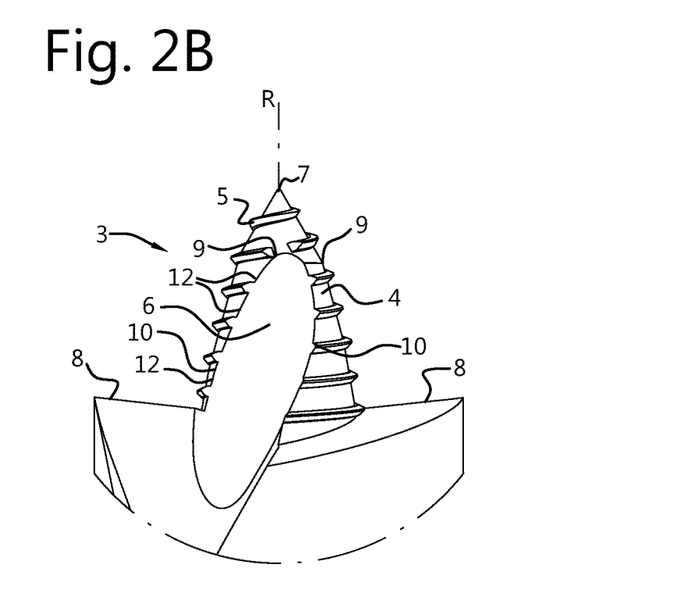
Figure 3A:
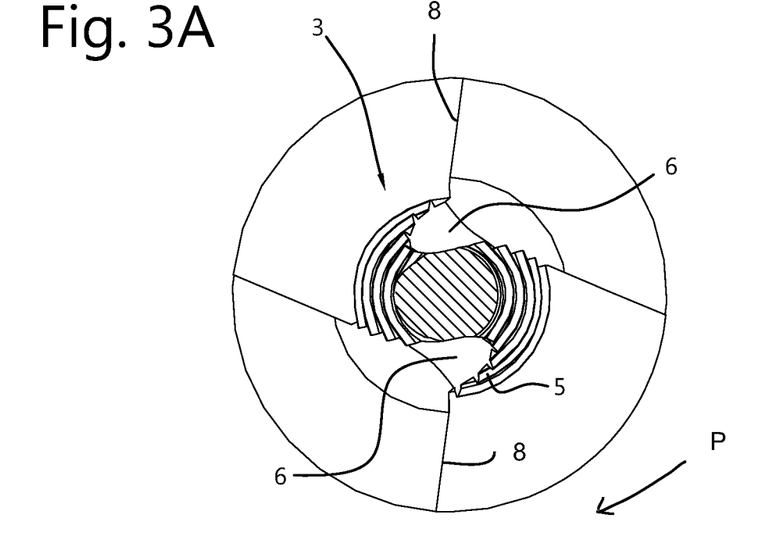
FIG. 3A-3D show four transverse cross sectional views as indicated in FIGS. 2A and 2B.
Figure 3B:
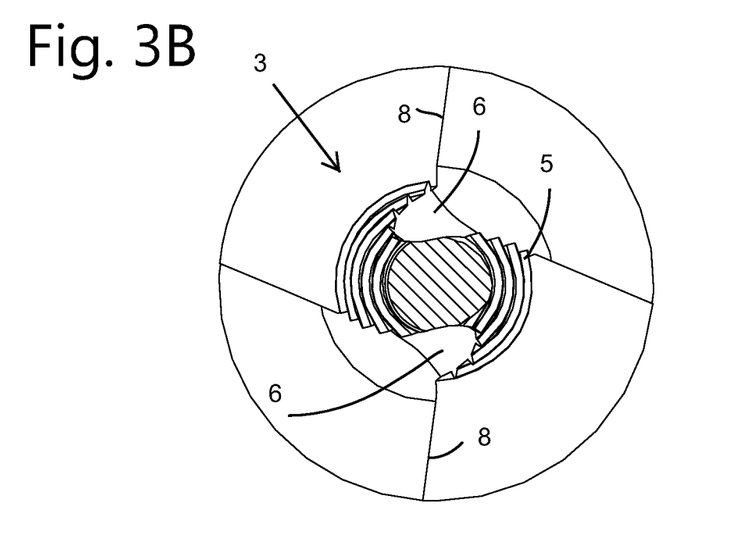
Figure 3C:
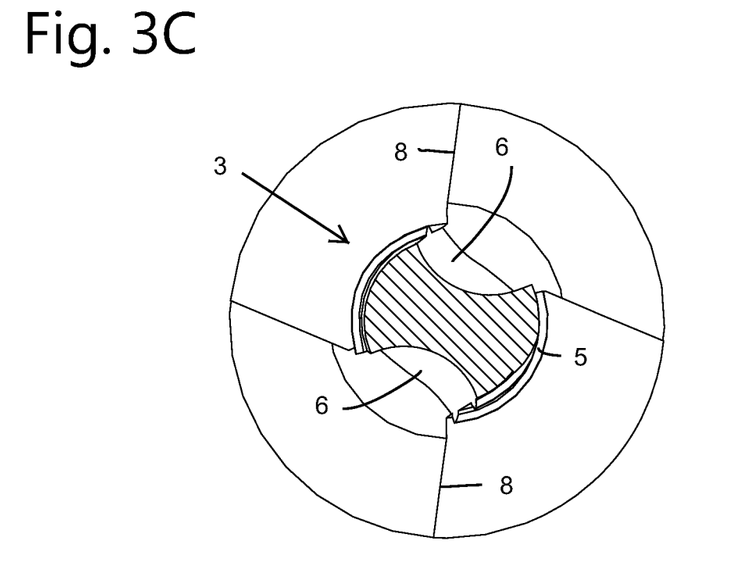
Figure 3D:
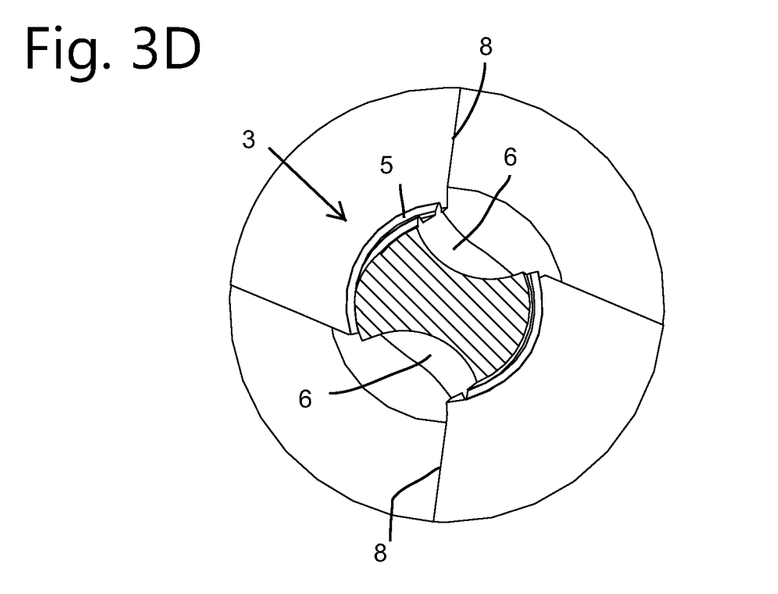

FIGS. 2A and 2B shows the working end of the drill bit 1 of FIG. 1 in more detail, and from two opposite sides. It clearly shows how the recess 6 starts at a distance below the apex 7 of the centering tip 3 in order to allow the centering tip 3 to provide centering and pulling the drill bit 1 into material to be worked when rotated about its drill axis R. The recess 6 is made in such a way that it provides cutting edges 12 for cutting chips and the curved bottom and asymmetric cross section (not indicated) are such that chips form and get transported to and into the chip removal groove 2. This also reduces friction on the centering tip 3 lateral surface 4. The step-start positions and even the steps are difficult to see, and indicated with reference numbers 9 and 10. In the example of FIGS. 2A and 2B, there are actual four zones of different taper angle. Starting at the apex 7, first the tapes angle is about 30 degrees. In embodiments, the first taper angle can be between 28 and 52 degrees. At a next step (again when going down from the apex 7), the taper angle changes in this embodiment to about 22 degrees. In embodiments, it can change to between 20 and 30 degrees. When rotating about 180 degrees, a third, next step occurs which changes the taper angle to about 15 degrees. In embodiments, this third step can be between 12 and 20 degrees. At a fourth step, the taper angle changes to about 10 degrees. In embodiments, the taper angle can change to between 8 and 12 degrees.

The changes and generatrical extend of the change is such that the apex 7 is functionally on the rotational axis R of the drill bit 1. In the current embodiment, the steps extend along a generatrix and continue around the centering tip 3 along a perimetrical line that is parallel to the centrix. This means a perimeter that is in a plane having the drill axis R as a normal.

The recess 6 has a center axis that spirals opposite the thread 5.

In FIGS. 3A-3D, four subsequent transverse cross sections normal to the drill axis R are shown. These cross sections illustrate that in the embodiment, the cross section of the core of the centering tip 3 is in fact asymmetrical. In these cross section, it is seen that the recess 6 here in fact spirals opposite the thread 5. Furthermore, it shows the curved bottom of the recess 6.

Figure 4A:
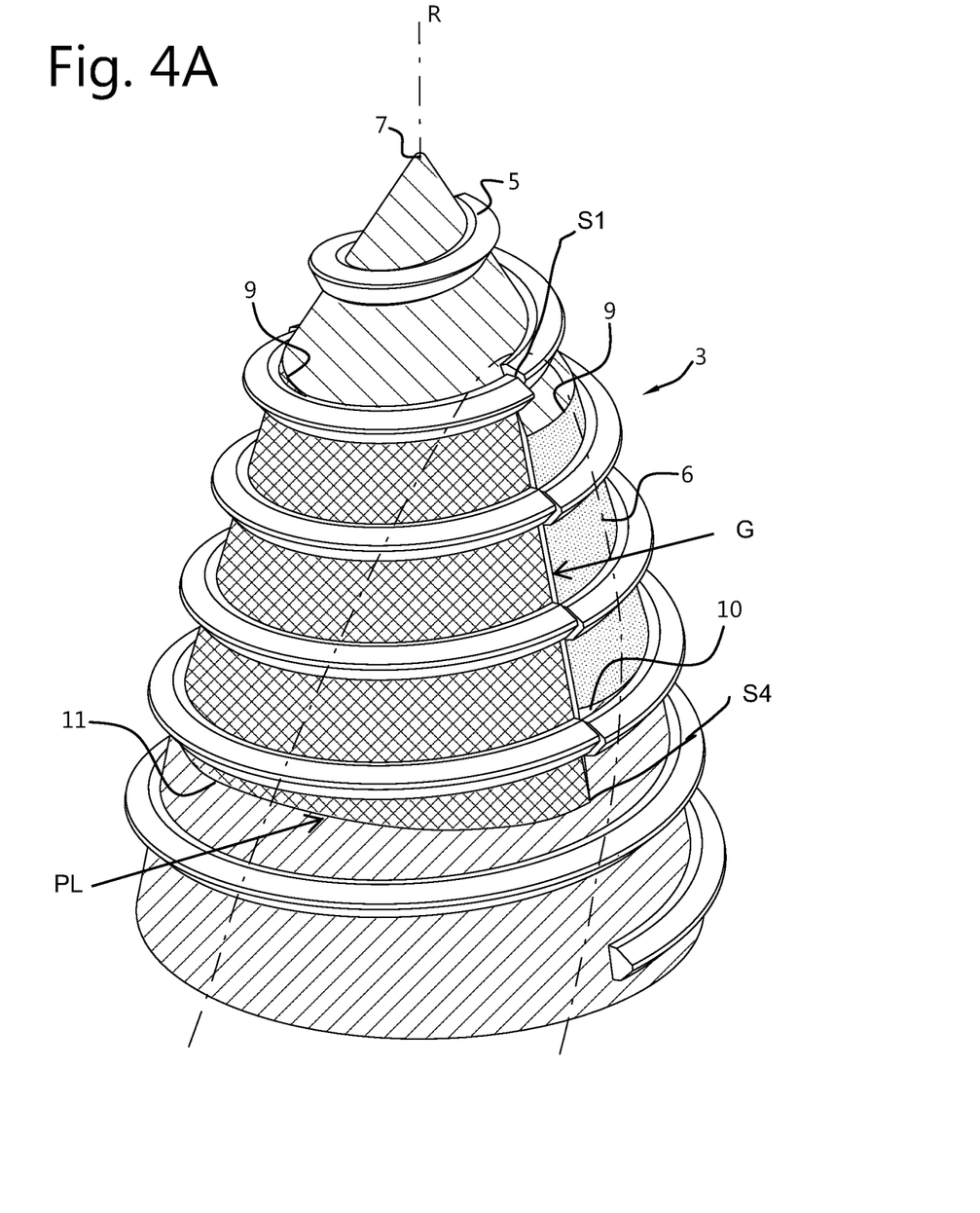
FIGS. 4A-4C show three consecutive side views of the centering tip of the drill bit of FIG. 1, without the recess.
Figure 4B:
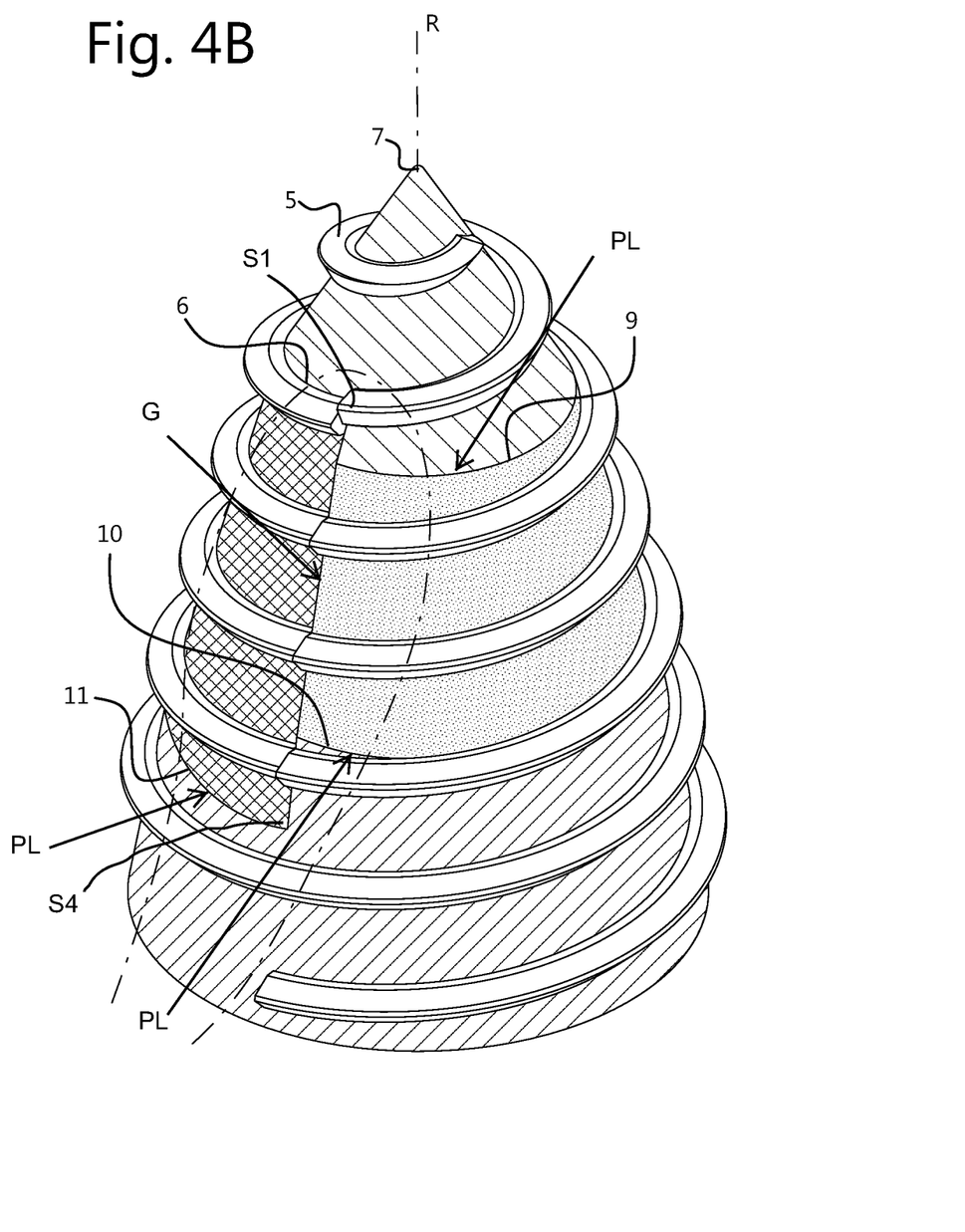
Figure 4C:
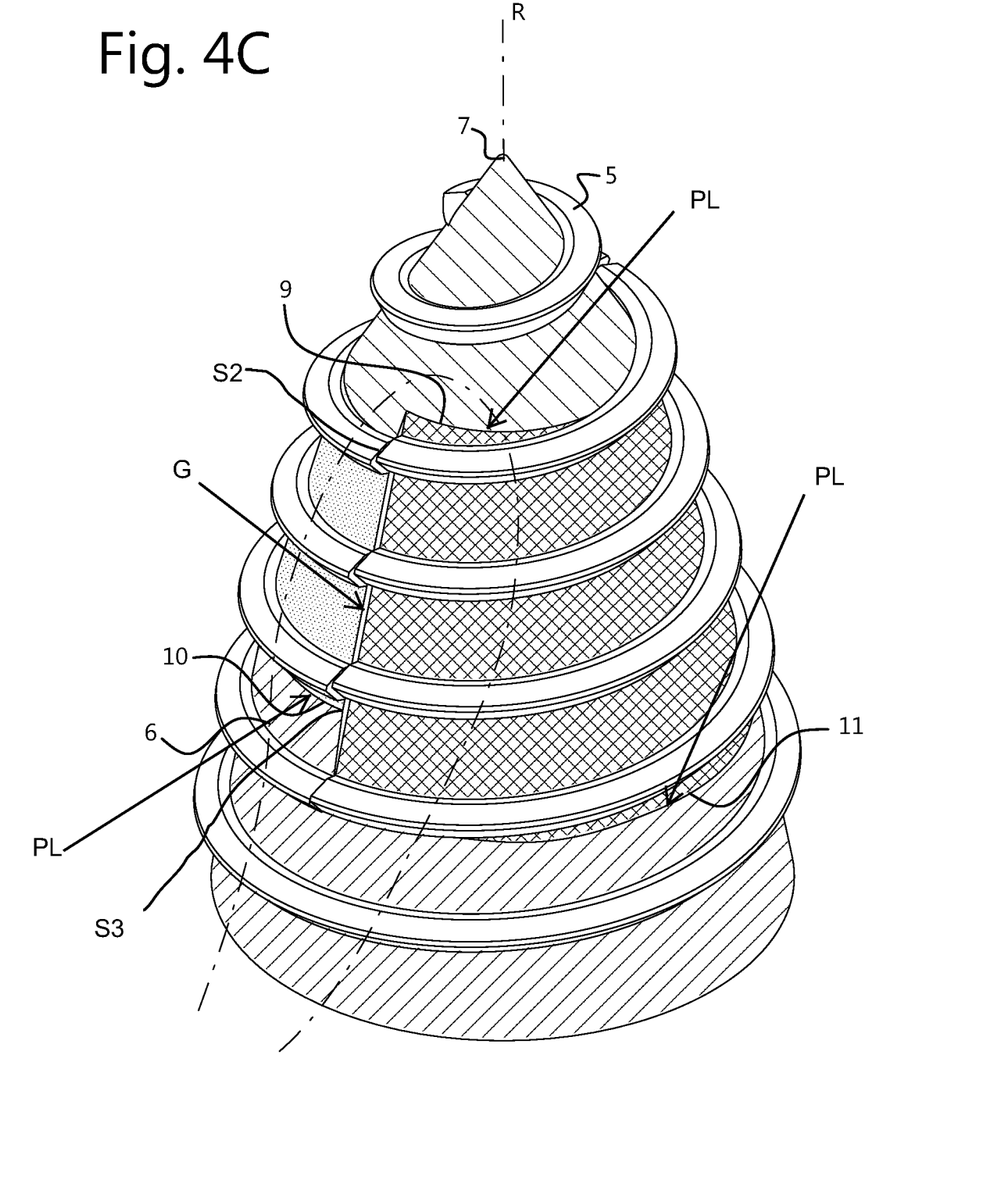

FIGS. 4A-4C show three consecutive side views of the centering tip 3 of the drill bit 1 of FIG. 1, without the recess 6 in order to more clearly see the steps. The position of the recess 6 is indicated through the dotted line.

The different regions with different taper angles are indicated with different types of hatchings. FIG. 4A shows the centering tip 3 from almost the same side as FIG. 2A. In FIG. 4B, the centering tip is rotated about 90 degrees clockwise (when seen from the apex 7) with respect to FIG. 4A. In FIG. 4C, the centering tip 3 is rotated almost 180 degrees with respect to FIG. 4B, showing the side that cannot be seen in the other two drawings.

In the current design, virtual step starting points S are positioned on two generatrixes that are on opposite sides of the centering tip 3. Designing the step start positions (in fact virtually) on a generatrix allows a recess that allows avoiding other steps in the lateral surface. Consequently, the actual real step start positions are thus at the edges of the recess. The changes or steps in the taper angle causes also some steps in the lateral surface in a perimetrical direction, as can be seen in FIG. 4. In these drawings, the generatrix step sections G are indicates, and perimerical lines PL are indicated. In the current embodiment, the perimetrical lines PL are in fact parallel to the directrix. When making the centering tip 3 using machining, usually first the rough shape of the centering tip including the thread is made, then the recesses are made, and then the other details and thread are made.

The current changes in taper angle in the depicted embodiment can also be regarded in the following way. The cone is first designed in the lowest taper angle of the lower end of the centering tip 3. Starting from S4 (FIG. 4A), in a step the taper angle increase. Usually, that first increase is between 4 and 15 degrees. Here it is about 5 degrees, stepping from 10 to 15 degrees. This increase is along the generatrix continues along the perimeter PL. It can be spiraling up, i.e., opposite to the thread. Here a track that is parallel to the directrix is selected. The step continues here 180 degrees about the cone. FIG. 4C shows the end.

At a subsequent step start position S3 (FIG. 4C), a next change in taper angle starts. Here, it is on the same generatrix G where the earlier step ended, but more up towards the apex 7. This step also continues along a perimeter PL that is again parallel to the directrix. It continues again 180 degrees around the centering tip 3, the end can be seen in FIGS. 4A and 4B. The step of the taper angle can be between 5 and 15 degrees. Here it is about 12 degrees, stepping from 10 degrees to 22 degrees. In the current embodiment, the taper angle is selected equal to the taper angle at the earlier step.

The dotted and cross-hatched parts are here both 180 degrees sections.

At a step start position S2 (FIG. 4C), on the same generatrix G as step start point S3, a next step in the taper angle occurs. This step now continues again for 180 degrees. The end can be seen in FIGS. 4A and 4B. This step is between 10 and about 15 degrees. Here it is about 12 degrees, stepping from 15 to 22 degrees.

When continuing up towards the apex 7 along the generatrix G of step start position S4, a final step start position S1 can be found. This step again continues for 180 degrees around the centering tip 3. Here it is indicates with the same line hatches. Often, it has the same taper angle in order to provide a top of the centring tip that is symmetric to allow the centering tip to enter material to be worked. It may also have a different taper angle.

In the design of the centering tip 3, a basic requirement usually is to have the apex 7 on the drill axis R.

In the current embodiment of FIGS. 4A-4C, the centering tip 3 can also be described as having a base with a first tapering angle and a tip having a different, wider taper angle. Connecting the base and tip, the centering tip 3 comprises a first band with a first band height and a first band perimetrical angle and a first band taper angle and provided on one side of the centering tip 3. The centering tip further comprises a second band with a second band height and a second band perimetrical angle and a second taper angle and provided on a second side of the centering tip 3 opposite to the first side.

In an embodiment, the first and second band span 180 degrees around the centering tip 3, i.e., the perimetrical angle is 180 degrees. In yet a further embodiment, the first and second taper angles are equal or functional equal.

As in fact in FIGS. 4A-4C the recess was indicated in dotted lines only and was left out in order to more clearly illustrate the design step of the steps, the actual step start positions will be at the edge of the recesses 6. In fact, as the tapes angle starting at S4 will be equal to the taper angle at S3, there will be two step start positions on one recess 6 and two step starts on the other recess 6. The will be clock-wise advanced with respect to the indicates S1-S4.

With the steps in tapering angle, it is possible to make the centering tip 3 asymmetrical, thus reducing wear and allowing easier propulsion of the drill bit 1 into material to be worked. The change also accommodate easier chip breaking.

Figure 5:
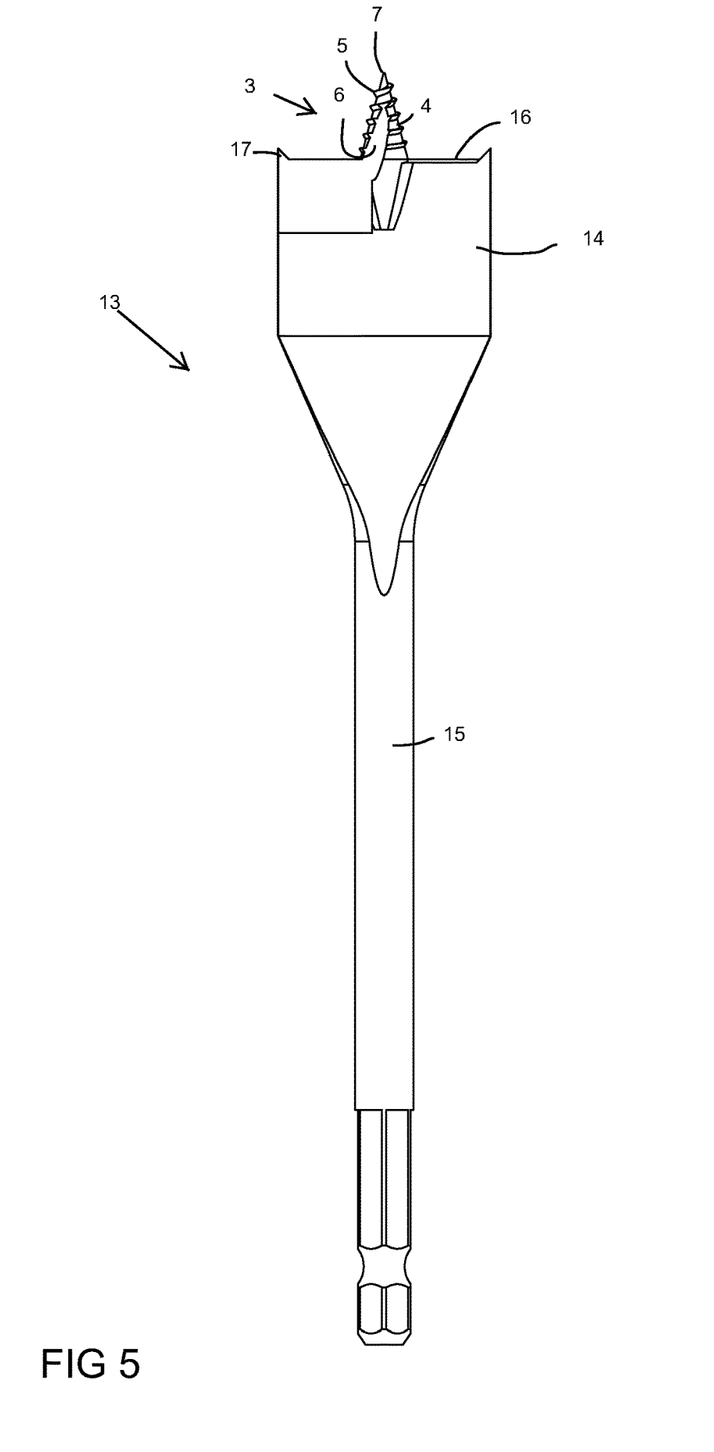
FIG. 5 a spade bit with a current centering tip.

In FIG. 5 an application of the centering tip 3 is for a spade bit 13 is illustrated. Such a spade bit comprises a blade 14 on a shank 15. The blade 14 comprises blade end cutting edges 16. In this embodiment, the blade 14 further comprises spurs 17 at the blade end at the radial ends of the blade 14.

Figure 6A:
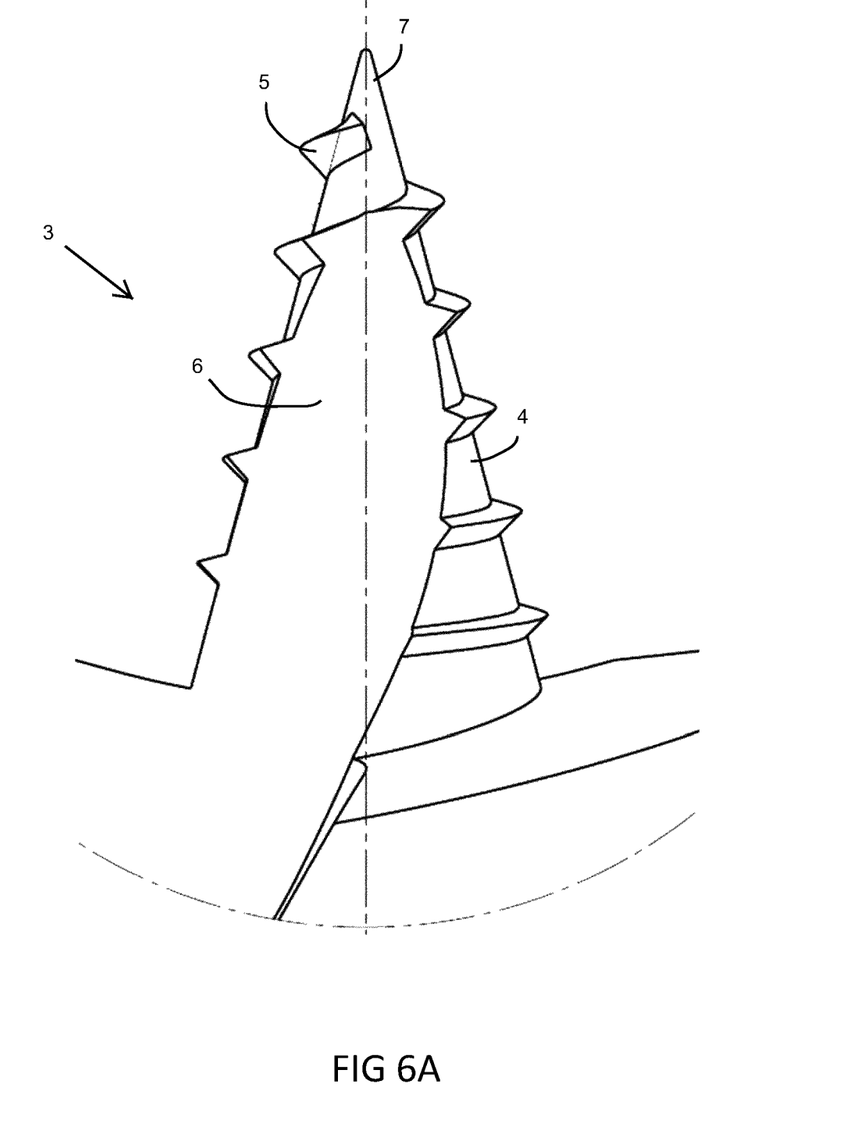
FIGS. 6A-6C a centering tip with a-symmetric recesses.
Figure 6B:
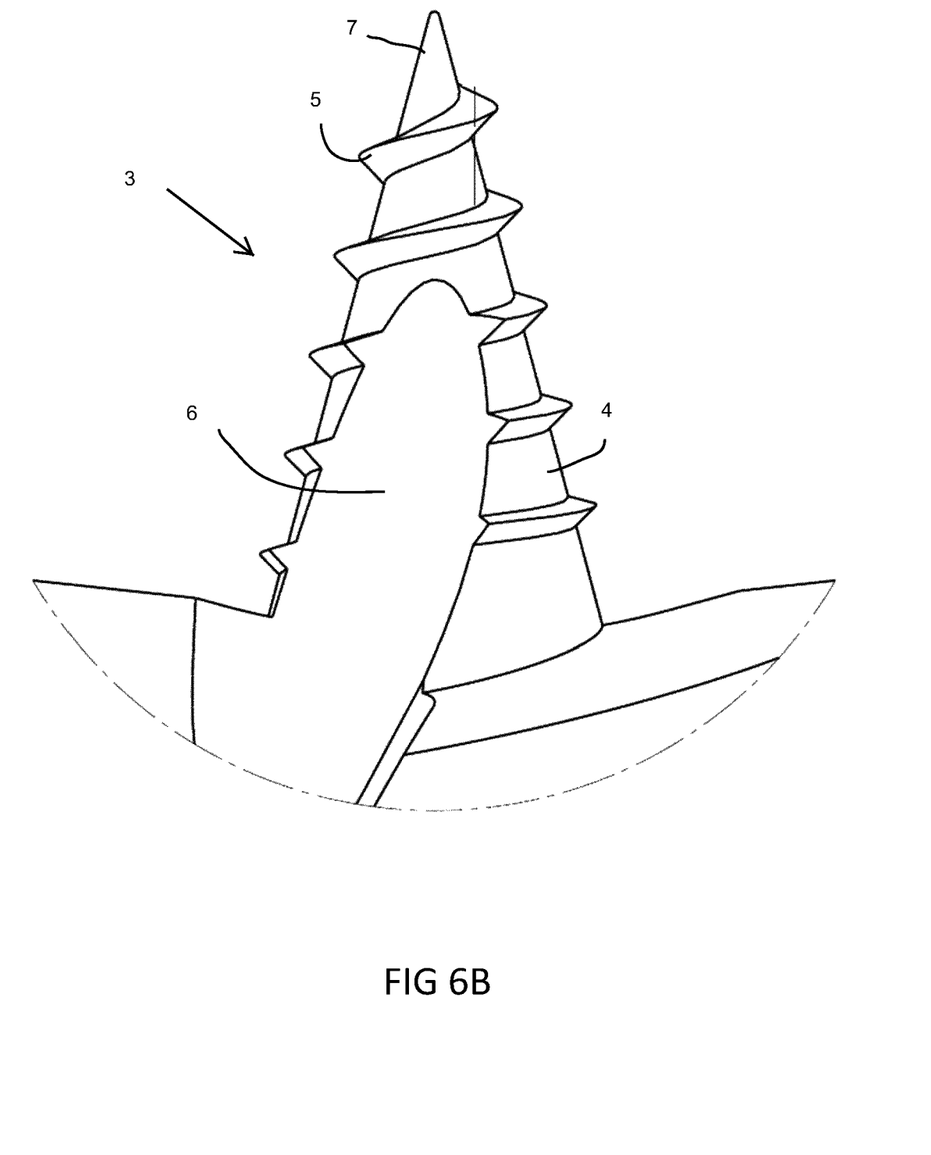
Figure 6C:
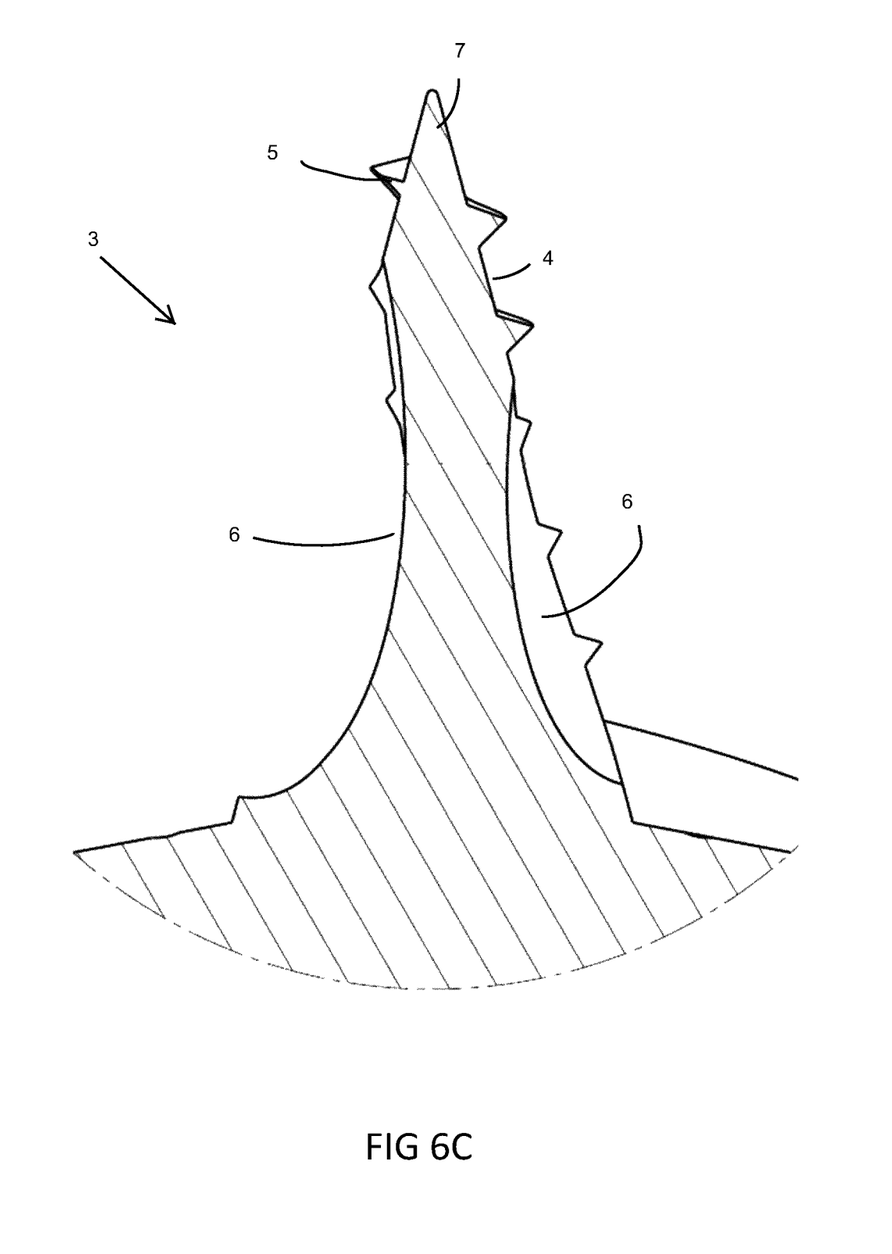

FIGS. 6A-6C shows an example of a centering tip from two opposite sides (FIGS. 6A and 6B) and in cross section (FIG. 6C). In this embodiment, the recesses 6 are opposite one another. Furthermore, they end at different heights from the apex 7 of the centering tip 3. Thus providing asymmetric recesses 6. This provides less friction. It can provide a smoother penetration of the material to be drilled. The centering tip 3 of FIGS. 6A-6C can further have all the features discussed above.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS

1 Drill bit
2 Chip removal or ejection groove
3 Centering tip
4 lateral surface
5 Centering tip helical thread
6 Tip recess
7 Apex
8 Main cutting edge
9 taper angle step
10 taper angle step
11 taper angle step
12 recess cutting edge
13 spade bit
14 blade
15 shank
16 blade end cutting edge
17 spur
S1 Step start position 1
S2 Step start position 2
S3 Step start position 3
S4 Step start position 4
R drill axis
P drilling rotation direction
G generatrix step section
PL perimeter line

The invention claimed is:

1. A drill bit comprising a circumferential chip removal groove helically about a drill axis and a centering tip:
having a conical shape with an apex on said drill axis;
comprises a lateral surface that has a taper angle;
comprising a centering tip helical thread which spirals helically from said apex down said centering tip in a thread direction of rotation at a tip thread pitch, and
comprising at least one tip recess in a side of the centering tip which provides a cutting edge, and which has a chip-transporting shape and connecting to said helical thread,
wherein said lateral surface comprises at least one step in said taper angle of said lateral surface with each step starting at a step-start position and said at least one step continues at least 90 degrees about said drill axis.

2. The drill bit of claim 1, wherein said step spirals up said centering tip between at least two subsequent threads of said centering tip helical thread.

3. The drill bit of claim 1, wherein the at least one step spirals up said centering tip, in a direction of step rotation which is opposite of said direction of thread rotation, thus providing a change of said taper angle, said at least one step designed to position said apex on said drill axis.

4. The drill bit of claim 1, wherein said at least one step comprises a first step in said taper angle starting at a first step start position and increasing said taper angle with at least 5 degrees.

5. The drill bit of claim 1, wherein each next step more towards the apex defines a larger taper angle than a previous step.

6. The drill bit of claim 1, wherein virtual step start positions are designed on generatrix step sections on opposite sides of the centering tip and said centering tip comprises two opposite recesses positioned on said generatrix step sections, thus providing step start positions on edges of said recesses.

7. The drill bit of claim 1, wherein steps in said taper angle between recess edges provide differing taper angels while positioning said apex on said drill axis, thus providing an asymmetric centering tip.

8. The drill bit of claim 1, comprising two of said recesses opposite one another on said centering tip, and said at least one step running from one recess to the next.

9. The drill bit of claim 1, wherein the at least one recess extends between a directix of said centering tip and said apex over at least two thread distances.

10. A centering tip for a drill bit, the centering tip comprising:
a conical shape with an apex on a drill axis;
a lateral surface that has a taper angle;
a centering tip helical thread which spirals helically from said apex down said centering tip in a thread direction of rotation at a tip thread pitch, and
at least one tip recess in a side of the centering tip which provides a cutting edge, and which has a chip-transporting shape and connecting to said helical thread,
wherein said lateral surface comprises at least one step in said taper angle of said lateral surface with each step starting at a step-start position and said at least one step continues at least 90 degrees about said drill axis.

11. The centering tip of claim 10, wherein the drill bit is a serpentine drill.

12. The centering tip of claim 10, wherein the drill bit is an auger drill bit.

13. The drill bit of claim 1, wherein the drill bit is a serpentine drill.

14. The drill bit of claim 1, wherein the drill bit is an auger drill bit.

15. The drill bit of claim 4, wherein said at least one step further comprises a second step having a second step start position at a centering tip height between said first step start position and said apex and increasing said taper angle at least 10 degrees.

16. The centering tip of claim 10, wherein the step-start position is located at an edge of the recess.

17. The centering tip of claim 10, further comprising a base having a first taper angle and a tip having a second taper angle, wider than the first taper angle, and an intermediate band located between said base and said tip and having a third taper angle different from said first and second taper angles.

18. The centering tip of claim 17, wherein the intermediate band comprises two sections, each section extending for 180 degrees about said drill axis, one of the two sections having the third taper angle and the other of the two sections having a different, fourth taper angle.

* * * * *